(12) United States Patent
Okazawa et al.

(10) Patent No.: US 9,477,140 B2
(45) Date of Patent: Oct. 25, 2016

(54) IMAGING DEVICE, CAMERA SYSTEM AND IMAGE PROCESSING METHOD

(71) Applicant: Olympus Corporation, Hachioji-shi, Tokyo (JP)

(72) Inventors: Atsuro Okazawa, Hino (JP); Takuya Matsunaga, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/869,449

(22) Filed: Sep. 29, 2015

(65) Prior Publication Data

US 2016/0018721 A1 Jan. 21, 2016

Related U.S. Application Data

(63) Continuation of application No. PCT/JP2014/067988, filed on Jul. 4, 2014.

(51) Int. Cl.
*H04N 5/225* (2006.01)
*G03B 13/36* (2006.01)
(Continued)

(52) U.S. Cl.
CPC ............... *G03B 13/36* (2013.01); *G02B 7/34* (2013.01); *H04N 5/232* (2013.01); *H04N 5/23212* (2013.01); *H04N 5/365* (2013.01); *H04N 5/3651* (2013.01); *H04N 5/378* (2013.01)

(58) Field of Classification Search
CPC ............ H04N 5/2178; H04N 5/2171; H04N 5/2176; H04N 5/3675; H04N 1/4097; H04N 5/2259; G06K 9/209; G08B 13/19626; G08B 13/19628
See application file for complete search history.

(56) References Cited

U.S. PATENT DOCUMENTS 7,983,509 B1 * 7/2011 Banner .................. G06T 5/003
382/266
2001/0008418 A1 * 7/2001 Yamanaka ........... H04N 5/3572
348/222.1
(Continued)

FOREIGN PATENT DOCUMENTS

JP 3592147 3/2004
JP 2010-26011 2/2010
(Continued)

OTHER PUBLICATIONS

International Search Report (PCT/ISA/210) to International Application No. PCT/JP2014/067988, mailed Oct. 7, 2014 (3 pgs.), with translation (2 pgs.) and corresponding Written Opinion of International Search Authority (PCT/ISA/237) (3 pgs.).
(Continued)

*Primary Examiner* — Twyler Haskins
*Assistant Examiner* — Dwight C Tejano
(74) *Attorney, Agent, or Firm* — John C. Pokotylo; Straub & Pokotylo

(57) ABSTRACT

An imaging device includes an optical information acquiring section that acquires optical information of a photographing optical system to form an image in the imaging element, an optical function calculating section that calculates an optical function to determine the correction function based on the optical information, a pixel function calculating section that calculates a pixel function to determine the correction function based on the pixel outputs of pixels positioned around focus detecting pixels, and a correction function selecting section (2172*d*) that selects the correction function to correct the pixel output to be output from the focus detecting pixels corresponding to current frame, based on the optical function, the pixel function and the optical information.

25 Claims, 7 Drawing Sheets

(51) Int. Cl.
*G02B 7/34* (2006.01)
*H04N 5/232* (2006.01)
*H04N 5/365* (2011.01)
*H04N 5/378* (2011.01)

(56) References Cited

U.S. PATENT DOCUMENTS

| | | | |
|---|---|---|---|
| 2002/0008715 A1* | 1/2002 | Sorek | G06K 9/209 345/698 |
| 2006/0013479 A1* | 1/2006 | Trimeche | H04N 9/045 382/167 |
| 2006/0152589 A1* | 7/2006 | Morrison | G06K 9/209 348/208.1 |
| 2008/0095466 A1* | 4/2008 | Kinrot | G06T 1/0007 382/284 |
| 2010/0073527 A1* | 3/2010 | Ichimiya | H04N 5/367 348/247 |
| 2010/0110272 A1* | 5/2010 | Sugawara | H04N 5/367 348/341 |
| 2013/0271629 A1* | 10/2013 | Sambonsugi | H04N 5/367 348/246 |
| 2015/0022691 A1* | 1/2015 | Matsunaga | H04N 5/2176 348/231.6 |

FOREIGN PATENT DOCUMENTS

| | | |
|---|---|---|
| JP | 4770560 | 1/2011 |
| JP | 2011-197080 | 10/2011 |
| JP | 2012-42857 | 3/2012 |
| JP | 2012-114798 | 6/2012 |

OTHER PUBLICATIONS

Translation of International Preliminary Report on Patentability and Written Opinion of the International Searching Authority to International Application No. PCT/JP2014/067988, mailed on Jan. 21, 2016 (5 pgs.).

* cited by examiner

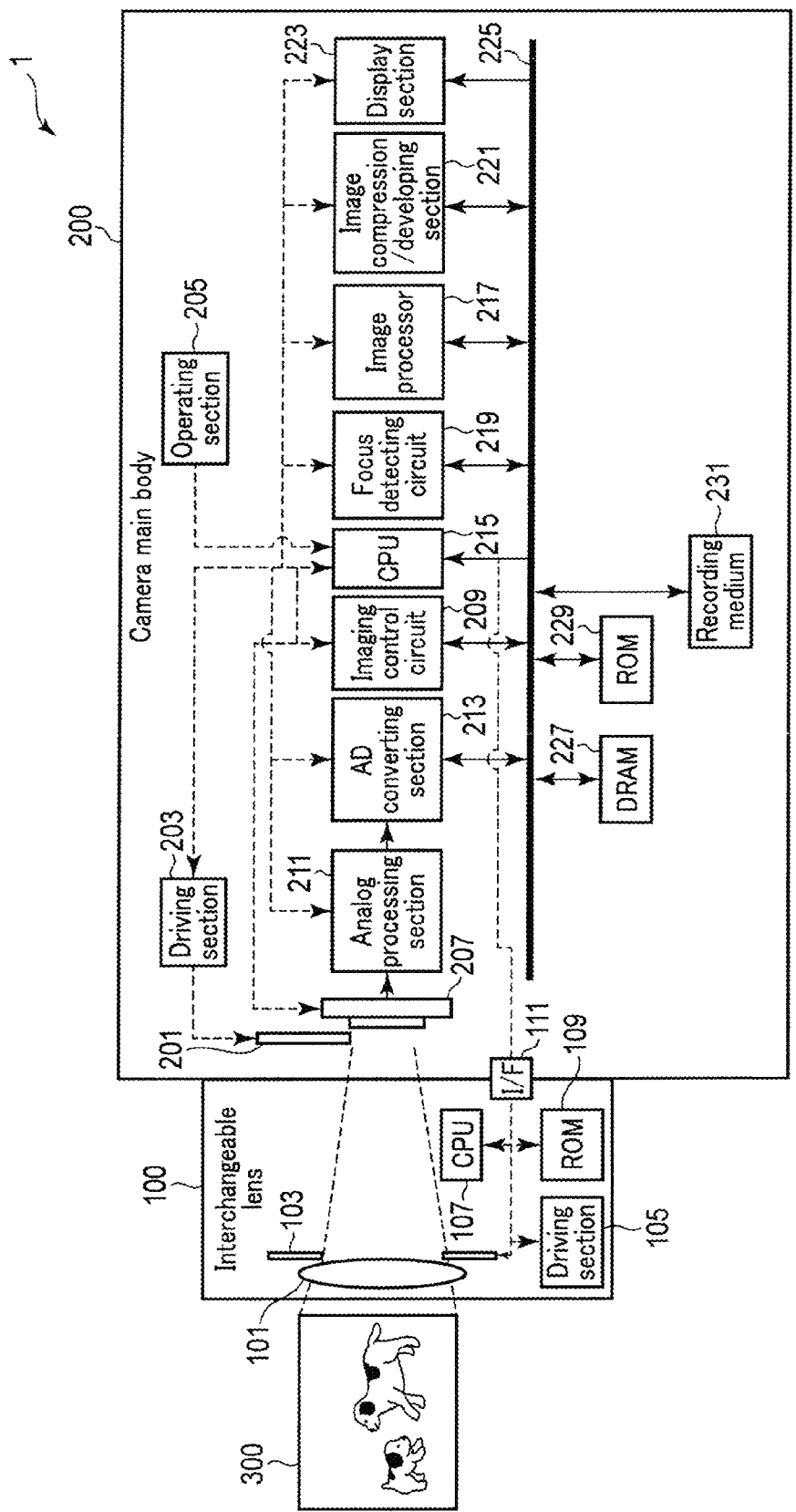
F I G. 1

IMAGING DEVICE, CAMERA SYSTEM AND IMAGE PROCESSING METHOD

CROSS-REFERENCE TO RELATED APPLICATIONS

This application is a Continuation Application of PCT Application No. PCT/JP2014/067988, filed Jul. 4, 2014 and based upon and claiming the benefit of priority from the prior Japanese Patent Application No. 2013-144621, filed Jul. 10, 2013, the entire contents of both of which are incorporated herein by reference.

BACKGROUND OF THE INVENTION

1. Field of the Invention

The present invention relates to an imaging device which processes a pixel output of an imaging element utilizing parts of pixels as a focus detecting element of a phase difference system to detect a focus state, a camera system and an image processing method.

2. Description of the Related Art

A suggestion concerning an imaging device which utilizes parts of pixels of an imaging element as a focus detecting element to detect a focus state has been made in, for example, the publication of Japanese Patent No. 3592147. The imaging device of the publication of Japanese Patent No. 3592147 sets the parts of the pixels of the imaging element to focus detecting pixels, forms images of subject luminous fluxes passed through different pupil regions symmetric to an optical axis center of a photographing lens in the focus detecting pixels, and detects a phase difference between the subject luminous fluxes to detect the focus state of the photographing lens.

Regions of parts of the focus detecting pixels are shielded from light. Therefore, pixel outputs of the focus detecting pixels are pixel outputs whose light is decreased as compared with normal pixels. It is known that a quantity of the light to be decreased in the focus detecting pixels changes in accordance with optical characteristics concerning the focus detecting pixels. Thus, the publication of Japanese Patent No. 4770560 has suggested that the pixel outputs of the focus detecting pixels are corrected in accordance with the optical characteristics.

BRIEF SUMMARY OF THE INVENTION

An imaging device according to a first aspect of the invention comprises: an imaging section that performs imaging by an imaging element in which focus detecting pixels to perform focus detection are disposed at positions of parts of imaging pixels, and outputs image data; an image processor that corrects pixel outputs to be output from the focus detecting pixels in the image data by a correction function; and a control section that allows the imaging section to repeatedly execute an imaging operation, and acquires the image data corresponding to frames, wherein the image processor includes: an optical information acquiring section that acquires optical information of a photographing optical system to form an image in the imaging element; an optical function calculating section that calculates an optical function to determine the correction function based on the optical information; a pixel function calculating section that calculates a pixel function to determine the correction function based on the pixel outputs of the pixels positioned around the focus detecting pixels; and a correction function selecting section that selects the correction function to correct the pixel output to be output from the focus detecting pixel corresponding to each of the frames, based on the optical function, the pixel function and the optical information.

A camera system according to a second aspect of the invention comprises: a camera main body having an imaging element in which focus detecting pixels to perform focus detection are disposed at positions of parts of imaging pixels; and an interchangeable lens detachably attached to the camera main body and having a photographing optical system, wherein the interchangeable lens comprises: an optical information generating section that generates an optical information concerning the photographing optical system; and a lens control section that performs communication with the camera main body, and transmits the optical information, the camera main body comprises: an imaging section that images by the imaging element and outputs image data; an image processor that corrects pixel outputs to be output from the focus detecting pixels in the image data by a correction function; and a control section that performs communication with the lens control section to acquire the optical information, allows the imaging section to repeatedly execute an imaging operation, and acquire the image data corresponding to frames, and the image processor includes: an optical function calculating section that calculates an optical function to determine the correction function based on the optical information; a pixel function calculating section that calculates a pixel function to determine the correction function based on the pixel outputs of the pixels positioned around the focus detecting pixels; and a correction function selecting section that selects the correction function to correct the pixel output to be output from the focus detecting pixel corresponding to each of the frames, based on the optical function, the pixel function and the optical information.

An image processing method according to a third aspect of the invention comprises: allowing the imaging element to repeatedly execute an imaging operation to acquire the image data corresponding to frames; acquiring optical information of a photographing optical system to form an image in the imaging element; calculating an optical function to determine a correction function based on the optical information; calculating a pixel function to determine the correction function based on the pixel outputs of the pixels positioned around the focus detecting pixels; and selecting the correction function to correct the pixel output to be output from the focus detecting pixel corresponding to each of the frames, based on the optical function, the pixel function and the optical information.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a constitution of a digital camera as one example of an imaging device according to one embodiment of the present invention;

DETAILED DESCRIPTION OF THE INVENTION

Figure 2:
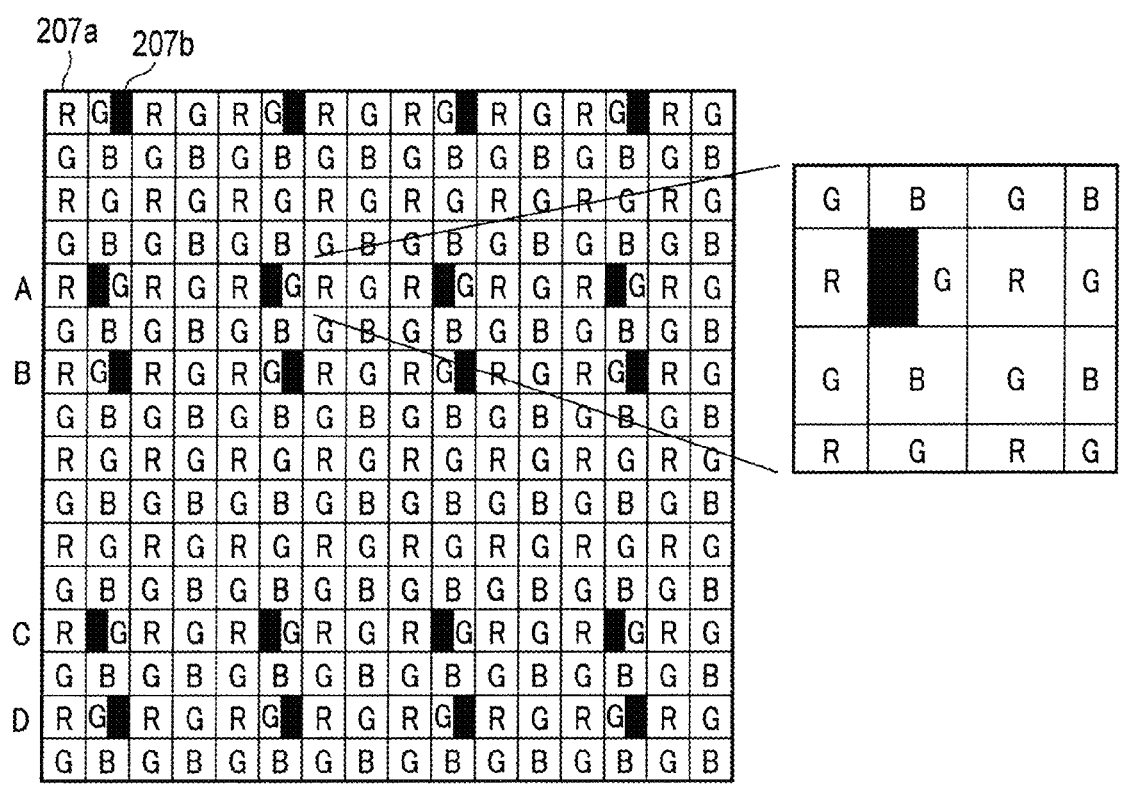
FIG. 2 is a view showing an example of a pixel array of an imaging element.

Hereinafter, embodiments of the present invention will be described with reference to the drawings.

FIG. 1 is a block diagram showing a constitution of a digital camera (hereinafter simply referred to as a camera) as one example of an imaging device according to one embodiment of the present invention. Here, in FIG. 1, solid lines with arrows indicate a flow of data and broken lines with arrows indicate a flow of a control signal. In addition, a camera of FIG. 1 illustrates a lens interchangeable type camera. However, the camera of the present embodiment does not necessarily have to be the lens interchangeable type camera.

A camera 1 shown in FIG. 1 includes an interchangeable lens 100 and a camera main body 200. The interchangeable lens 100 is attachable to and detachable from the camera main body 200. The interchangeable lens 100 is attached to the camera main body 200 to operate in accordance with control of the camera main body 200.

The interchangeable lens 100 includes a photographing lens 101, a diaphragm 103, a driving section 105, a CPU (Central Processing Unit) 107, a ROM 109, and an interface (I/F) 111.

The photographing lens 101 is a photographing optical system to form an image from a subject 300 on an imaging element 207. The photographing lens 101 may include a focus lens to adjust a focusing position and may have a constitution of a zoom lens. The diaphragm 103 is disposed on an optical axis of the photographing lens 101, and an aperture diameter of the diaphragm can be varied. The diaphragm 103 sets a limit to a quantity of a luminous flux passed through the photographing lens 101 from the subject 300. The driving section 105 performs driving of the photographing lens 101 and driving of the diaphragm 103 based on a control signal from the CPU 107.

The CPU 107 performs control of the driving section 105 and the like in accordance with control of a CPU 215 of the camera main body 200. The ROM 109 stores optical information of the photographing lens 101. The CPU 107 reads the optical information of the photographing lens 101 from the ROM 109 as required, and transmits the read optical information to the CPU 215 of the camera main body 200 via the I/F 111. The optical information of the photographing lens 101 which is stored in the ROM 109 is, for example, distortion aberration information of the photographing lens 101. The optical information includes a focal distance of the photographing lens 101, a position of the focus lens, an opening amount of the diaphragm 103 (an aperture value) and the like, in addition to the distortion aberration information. The information of the focal distance of the photographing lens 101, the position of the focus lens and the aperture value can successively be obtained at timing such as a photographing time.

The camera main body 200 includes a mechanical shutter 201, a driving section 203, an operating section 205, the imaging element 207, an imaging control circuit 209, an analog processing section 211, an analog/digital (AD) converting section 213, the CPU 215, an image processor 217, a focus detecting circuit 219, an image compression developing section 221, a display section 223, a bus 225, a DRAM (Dynamic Random Access Memory) 227, a ROM (Read Only Memory) 229, and a recording medium 231.

The mechanical shutter 201 is openable and closable. The mechanical shutter 201 adjusts an entrance time of the subject luminous flux from the subject 300 into the imaging element 207 (an exposure time of the imaging element 207). As the mechanical shutter 201, a known focal plane shutter, a lens shutter or the like is employable. The driving section 203 performs opening/closing control of the mechanical shutter 201 based on the control signal from the CPU 215.

The operating section 205 includes various operating buttons such as a power source button, a release button, a moving image button, a reproduction button, and a menu button and various operating members including a touch panel and the like. The operating section 205 detects an operating state of each type of operating member, and outputs a signal indicating a detection result to the CPU 215. By the operating section 205 of the present embodiment, it is possible to select a photographing mode of the camera 1. That is, a user operates the operating section 205, whereby the photographing mode of the camera 1 can be selected from a still image photographing mode and a moving image photographing mode. The still image photographing mode is a photographing mode to photograph a still image, and a moving image photographing mode is a photographing mode to photograph a moving image.

The imaging element 207 is disposed on the optical axis of the photographing lens 101 behind the mechanical shutter 201 and at a position where the subject luminous flux is formed into the image by the photographing lens 101. The imaging element 207 is obtained by two-dimensionally disposing photodiodes constituting pixels. The imaging element 207 in the present embodiment includes imaging pixels for acquiring an image to be recorded or displayed and focus detecting pixels for detecting a focus.

The photodiodes constituting the imaging element 207 generate electric charges corresponding to light receiving amounts. The electric charges generated by the photodiodes are accumulated in a capacitor connected to each photodiode. The electric charges accumulated in this capacitor are read as image signals. The imaging element 207 in the present embodiment has different electric charge reading systems. The electric charges accumulated in the imaging element 207 are read in accordance with a control signal from the imaging control circuit 209.

In a front surface of each of the photodiodes constituting the pixels, for example, a color filter of a Bayer array is disposed. The Bayer array has a line along which R pixels and G (Gr) pixels are alternately arranged in a horizontal direction, and a line along which G (Gb) pixels and B pixels are alternately arranged.

The imaging control circuit 209 sets the reading system of the imaging element 207 in accordance with the control signal from the CPU 215, and controls the reading of the image signal from the imaging element 207 in accordance with the set reading system. The reading system of a pixel output (pixel data) from the imaging element 207 is set in accordance with the operating state of the camera 1. For example, when real time properties are required in the reading of the pixel data from the imaging element 207 (e.g., during live view displaying or during moving image recording), the pixel data from the same color pixels are mixed and read or the pixel data of a specific pixel is thinned out to be read, so that the pixel data can be read at a high rate. On the other hand, when an image quality is required rather than the real time properties (e.g., during recording of the still image), the mixed reading or the thinned-out reading is not performed, but the pixel data of all the pixels is read to maintain a resolution.

The analog processing section 211 applies analog processing to the image signal read from the imaging element 207 in accordance with the control of the imaging control circuit 209. This analog processing includes correlated double sampling processing, gain regulation processing and the like.

The AD converting section 213 that functions as an imaging section together with the imaging element 207, the imaging control circuit 209 and the analog processing section 211 is an analog/digital converter, and converts the image signal subjected to the analog processing by the analog processing section 211 into a digital type of image signal (the pixel data). Hereinafter, in the present description, a set of pieces of pixel data will be written as imaging data.

The CPU 215 performs over all control of the camera 1 in accordance with a program stored in the ROM 229. In addition, the CPU 215 is communicably connected to the CPU 107 of the interchangeable lens 100 via the I/F 111, and inputs the control signal into the CPU 107 to control the interchangeable lens 100.

The image processor 217 applies various types of image processing to the imaging data to generate image data. For example, the image processor 217 applies image processing for still image recording to generate still image data, when the still image is recorded. Similarly, the image processor 217 applies image processing for moving image recording to generate moving image data, when the moving image is recorded. Furthermore, the image processor 217 applies the image processing for displaying to generate the image data for displaying, during the live view displaying. Such a constitution of the image processor 217 will be described in detail later.

The focus detecting circuit 219 acquires the pixel data from the focus detecting pixels, and calculates a defocus direction and a defocus amount to the focusing position of the photographing lens 101 by use of a known phase difference system based on the acquired pixel data.

The image compression/developing section 221 compresses the image data (the still image data or the moving image data) subjected to the image processing by the image processor 217, when the image data is recorded. In addition, the image compression/developing section 221 develops the compressed image data, when the image data is reproduced.

The display section 223 is a display section such as a liquid crystal display or an organic EL display, and is disposed on, for example, a back surface of the camera 1. The display section 223 displays the image in accordance with the image data for displaying. The display section 223 is for use in the live view displaying, displaying of the recorded image, or the like.

The bus 225 is connected to the AD converting section 213, the CPU 215, the image processor 217, the focus detecting circuit 219, the DRAM 227, the ROM 229, and the recording medium 231, and the bus 225 functions as a transfer path to transfer various types of data generated in these blocks.

The DRAM 227 is an electrically rewritable memory, and temporarily stores various types of data such as the above-mentioned imaging data (the pixel data), the image data for recording, the image data for displaying, and processed data in the CPU 215. It is to be noted that as a memory for temporary storage, an SDRAM (Synchronous Dynamic Random Access Memory) may be used. The ROM 229 is a nonvolatile memory such as a mask ROM or a flash memory. The ROM 229 stores the program for use in the CPU 215, and various types of data such as regulated values of the camera 1. Here, the ROM 229 in the present embodiment also stores an optical function (described in detail later) in predetermined optical information. The recording medium 231 is built or mounted in the camera 1, and records the image data for recording as an image file of a predetermined format.

A constitution of the imaging element 207 is described with reference to FIG. 2. FIG. 2 is a view showing an example of a pixel array of the imaging element 207. In addition, parts of the pixels are enlarged and shown on the right side of FIG. 2. FIG. 2 is an example of a Bayer array, but the array of the color filter is not limited to the Bayer array, and various arrays are applicable.

As described above, the imaging element 207 of the Bayer array has a pixel line along which the R pixels and the G (Gr) pixels are alternately arranged in the horizontal direction, and a pixel line along which the G (Gb) pixels and the B pixels are alternately arranged. In other words, a set of four pixels of the Gr pixel, the R pixel, the Gb pixel and the B pixel shown in the right enlarged view is repeatedly arranged in the horizontal direction and a vertical direction.

In the present embodiment, focus detecting pixels 207b are disposed at positions of parts of imaging pixels 207a. The focus detecting pixel is a pixel in which, for example, one of right and left regions is shielded from light by a light shielding film. In the example of FIG. 2, a line of the focus detecting pixels whose left half surfaces are shielded from the light (hereinafter referred to as right opening focus detecting pixels) and a line of focus detecting pixels whose right half surfaces are shielded from the light (hereinafter referred to as left opening focus detecting pixels) are arranged close to each other along the vertical direction.

In the case of the imaging element of a high pixel number, an area of an individual pixel becomes smaller, and hence, it can be considered that about the same image is formed in the pixels arranged close to each other. Therefore, the focus detecting pixels are arranged as shown in FIG. 2, so that a pair of the focus detecting pixel of a line A and the focus detecting pixel of a line B of FIG. 2 can detect a phase difference. In addition, a pair of the focus detecting pixel of a line C and the focus detecting pixel of a line D can also detect the phase difference.

Here, in the example of FIG. 2, the region to be shielded from the light in the focus detecting pixel is one of the right and left regions. In this case, it is possible to detect a horizontal phase difference. On the other hand, one of upper and lower regions or a region in an oblique direction is defined as the region to be shielded from the light, so that it is also possible to detect a vertical phase difference or an oblique phase difference. In addition, a light shielding area does not have to be ½ of the pixel region as long as the light shielding region has a certain degree of area. Furthermore, in FIG. 2, each focus detecting pixel is disposed in a G pixel, but may be disposed in an R pixel or a B pixel, except the G pixel. In addition, the example of FIG. 2 is an example where a pupil is split by shielding a partial region of the focus detecting pixel from the light, but the focus detecting pixel may selectively receive one of a pair of subject luminous fluxes passed through different pupil regions of the photographing lens 101. Consequently, a constitution where the partial region is shielded from the light does not have to be used, but the pupil may be split by, for example, a pupil splitting micro lens. Furthermore, FIG. 2 shows an example where the focus detecting pixels are disposed in a period of four pixels along the horizontal direction. The period in which the focus detecting pixels are disposed is not limited to a specific period.

The regions of the parts of the focus detecting pixels are shielded from the light, and hence, decrease of a light quantity occurs. This decrease of the light quantity also differs with an area of each light shielding film formed in the focus detecting pixel, and additionally, with a position of the light shielding film, an angle of the light that enters the focus detecting pixel, and an image height. Such a decrease of the light quantity is corrected in the image processor 217.

Figure 3:
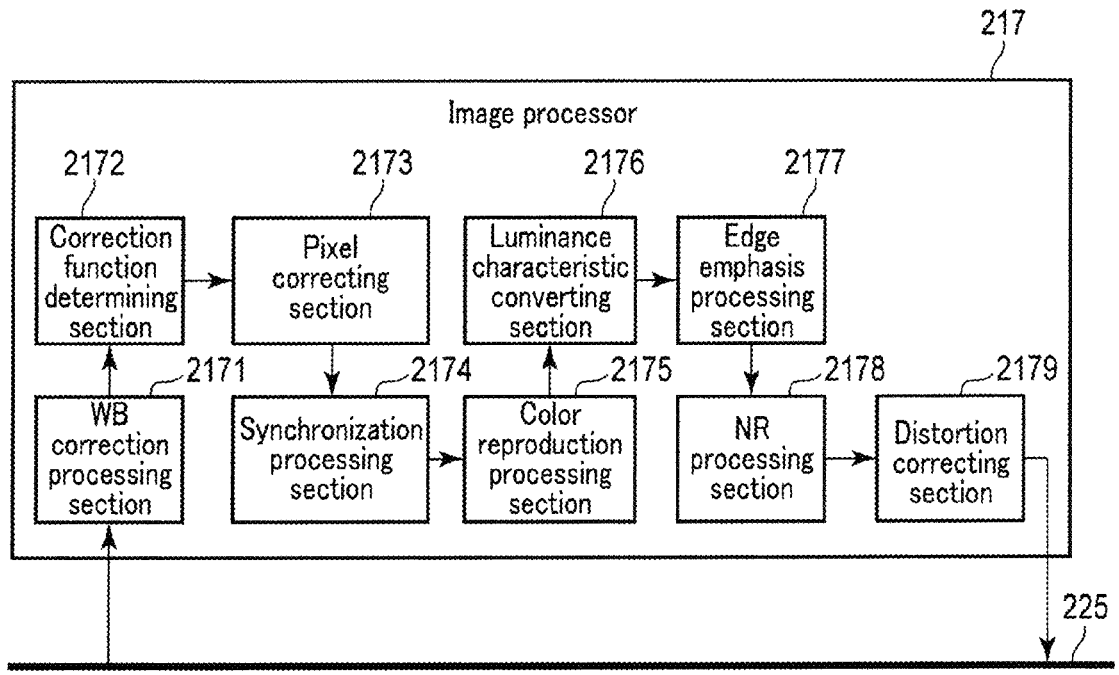
FIG. 3 is a view showing a detailed constitution of an image processor.

FIG. 3 is a view showing a detailed constitution of the image processor 217. In FIG. 3, the blocks other than the image processor 217 are omitted. The image processor 217 includes a white balance (WB) correction processing section 2171, a correction function determining section 2172, a pixel correcting section 2173, a synchronization processing section 2174, a color reproduction processing section 2175, a luminance characteristic converting section 2176, an edge emphasis processing section 2177, a noise reduction (NR) processing section 2178, and a distortion correcting section 2179.

The WB correction processing section 2171 amplifies each color component of the imaging data with a predetermined gain amount, thereby performing white balance correction processing to correct a color balance of the image.

The correction function determining section 2172 determines a correction function for use in calculating a correction value to correct the pixel output of each focus detecting pixel in the pixel correcting section 2173. The pixel correcting section 2173 calculates the correction value in accordance with the correction function determined by the correction function determining section 2172, and corrects the pixel output of the focus detecting pixel in accordance with the calculated correction value. Details of the correction function determining section 2172 and the pixel correcting section 2173 will be described later.

The synchronization processing section 2174 converts the imaging data in which one pixel corresponds to one color component, for example, the imaging data corresponding to the Bayer array and output via the imaging element 207, into the image data in which one pixel corresponds to color components. The color reproduction processing section 2175 performs various types of processing so that the color reproduction of the image data is appropriate. An example of this processing is a color matrix calculation processing. The color matrix calculation processing is processing of multiplying the image data by a color matrix coefficient corresponding to, for example, a white balance mode. In addition, the color reproduction processing section 2175 corrects a saturation/hue. The luminance characteristic converting section 2176 converts luminance characteristics (gamma characteristics) of the image data into characteristics suitable for the displaying or the recording. The edge emphasis processing section 2177 multiplies an edge signal extracted from the image data by use of a band pass filter or the like, by an edge emphasis coefficient, and adds this result to the original image data, thereby emphasizing an edge (contour) component in the image data. The NR processing section 2178 removes a noise component in the image data by use of coring processing or the like. The distortion correcting section 2179 corrects distortion aberration in the image data. For example, the distortion correcting section 2179 performs coordinate conversion of the image data prior to distortion correction in accordance with a predetermined function to correct the distortion aberration, thereby correcting the distortion aberration in the image data.

Figure 4:
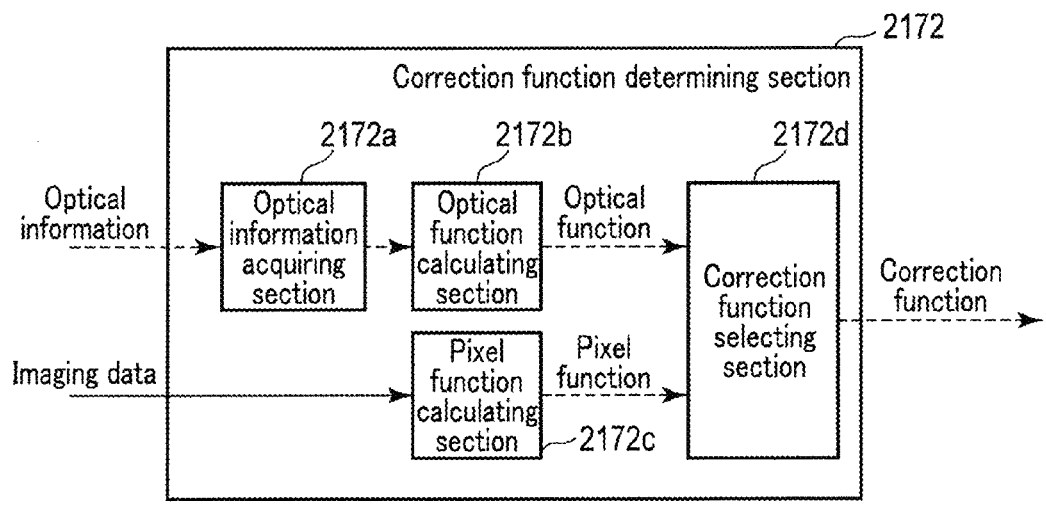
FIG. 4 is a view showing a constitution of a correction function determining section.

FIG. 4 is a view showing a constitution of the correction function determining section 2172. The correction function determining section 2172 includes an optical information acquiring section 2172a, an optical function calculating section 2172b, a pixel function calculating section 2172c, and a correction function selecting section 2172d.

The optical information acquiring section 2172a acquires the optical information of the photographing lens 101. The optical function calculating section 2172b calculates the optical function based on the optical information acquired by the optical information acquiring section 2172a. The optical function is a function in which a coordinate (e.g., a horizontal coordinate) of the focus detecting pixel, for example, when a uniform luminance surface is imaged is associated with the pixel output of the focus detecting pixel on the basis of the pixel output of the imaging pixel, and the function is beforehand stored in, for example, the ROM 229. This optical function indicates a light quantity decrease amount of the focus detecting pixel. The optical function fluctuates in accordance with change of the optical information which changes an entrance angle of the entering light entering the focus detecting pixel (e.g., the change of the focal distance, the change of the focusing position, and the change of the diaphragm). Therefore, in the ROM 229, there are previously stored the optical functions corresponding to the changes of the optical information for each type of optical information. The optical function calculating section 2172b acquires the optical function corresponding to the optical information acquired by the optical information acquiring section 2172a. It is to be noted that the optical function corresponding to desired optical information may be calculated by interpolation based on the optical function stored in the ROM 229.

The pixel function calculating section 2172c calculates a pixel function. The pixel function is a function that associates with the coordinate of the focus detecting pixel with the pixel output of the focus detecting pixel on the basis of the pixel output of the imaging pixel, and the function is calculated from the imaging data during the live view displaying or during moving image photographing. Here, the imaging data during the live view displaying or during the moving image photographing cannot necessarily be obtained by photographing the uniform luminance surface, and hence, there is the possibility that both the pixel output of the imaging pixel and the pixel output of the focus detecting pixel fluctuate under an influence of the change of a subject image (a pattern). To eliminate this influence of the change of the pattern, a degree of the influence of the change of the pattern around each focus detecting pixel is calculated from the pixel output of each of the imaging pixels around each focus detecting pixel, and the pixel function is calculated in consideration of this calculated influence of the change of the pattern. Details will be described later.

The correction function selecting section 2172d selects the correction function for use in calculating the correction value to correct the pixel output of the focus detecting pixel in the pixel correcting section 2173, from the optical function and the pixel function. It is determined which one of the optical function and the pixel function is to be selected as the correction function, in accordance with a reliability of the optical function calculated by the optical function calculating section 2172b (the optical function reliability) and a reliability of the pixel function calculated by the pixel function calculating section 2172c (the pixel function reliability). Details will be described later.

Figure 5:
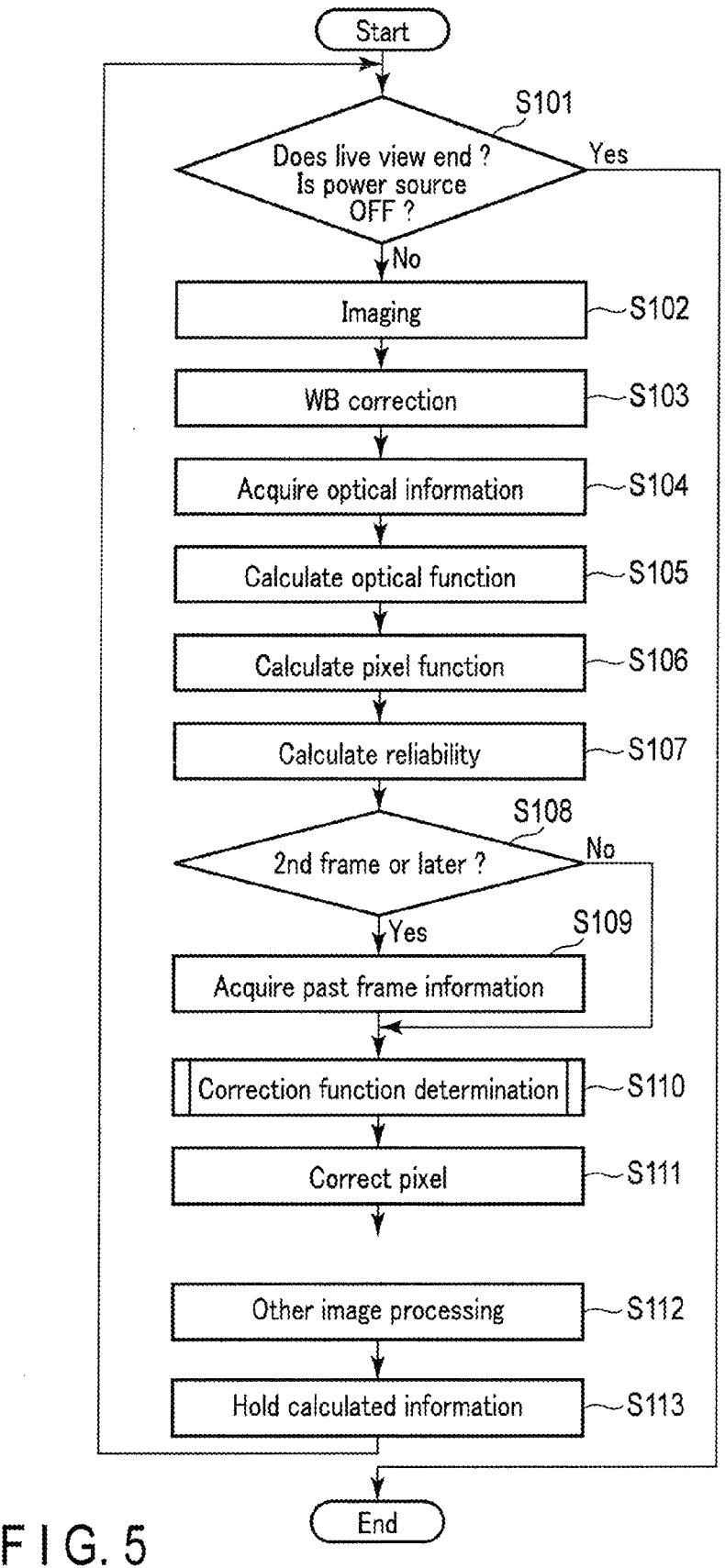
FIG. 5 is a flowchart showing processing of a live view operation by the imaging device.

Hereinafter, an operation of the imaging device of the present embodiment will be described. FIG. 5 is a flowchart showing processing of a live view operation by the imaging device. The processing of the flowchart shown in FIG. 5 is executed by the CPU 215 based on the program stored in the ROM 229. In addition, the processing shown in FIG. 5 is also applicable to a moving image photographing operation.

When the processing of the flowchart of FIG. 5 is started, the CPU 215 determines whether to end a live view or whether or not to turn off a power source of the camera 1 (step S101). For example, when execution of still image photographing is instructed by an operation of the release button, when execution of the moving image photographing is instructed by an operation of the moving image button, when reproduction of the image is instructed by an operation of the reproduction button, and when displaying of a menu is instructed by an operation of the menu button, it is determined that the live view is to be ended. In addition, for example, when it is instructed to turn off the power source of the camera 1 by the operation of the power source button, it is determined that the power source is to be turned off. When it is determined in the step S101 to end the live view or it is determined to turn off the power source, the CPU 215 ends the processing of FIG. 5.

When it is determined in the step S101 that the live view is not ended and when it is determined that the power source of the camera 1 is not turned off, the CPU 215 allows the imaging element 207 to execute imaging (exposure) for the live view (step S102). The image signal obtained by the imaging is read from the imaging element 207 in accordance with the previously set reading system. This read image signal is analog-processed by the analog processing section 211, digitized in the AD converting section 213, and then temporarily stored as the imaging data in the DRAM 227.

After the imaging for the live view, the CPU 215 allows the image processor 217 to execute image processing. At this time, the WB correction processing section 2171 of the image processor 217 reads the imaging data from the DRAM 227 to apply the white balance correction processing (step S103). Subsequently, the optical information acquiring section 2172a of the correction function determining section 2172 acquires present optical information (step S104). As described above, the optical information includes the focal distance of the photographing lens 101, the position of the focus lens, the aperture value, the distortion aberration information and the like. The optical information is acquired, and then, the optical function calculating section 2172b calculates the optical function (step S105). Hereinafter, an example of a calculating technique of the optical function will be described.

Figure 6:
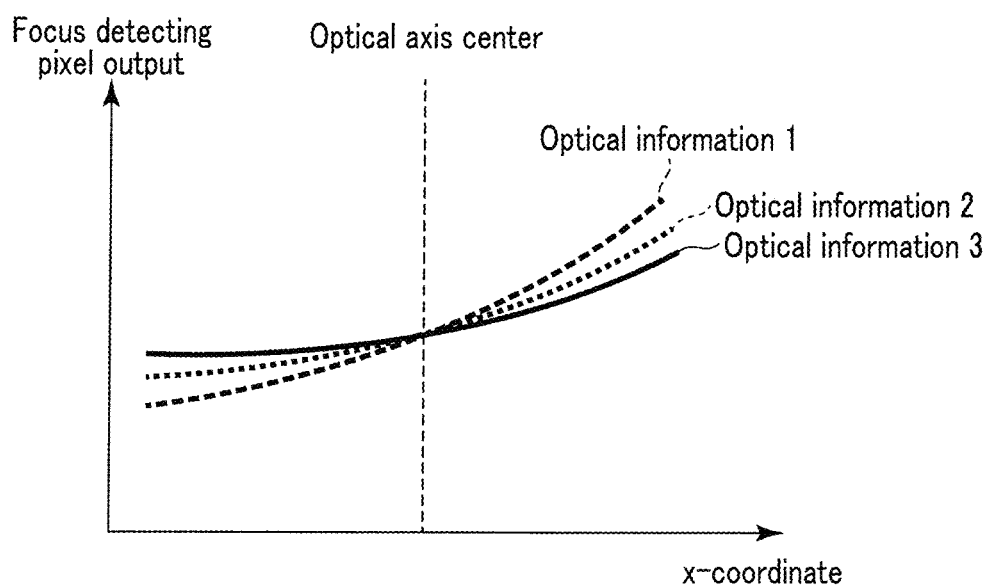
FIG. 6 is a diagram showing an example of an optical function.

FIG. 6 is a diagram showing an example of the optical function. The optical functions for the right opening focus detecting pixel and the left opening focus detecting pixel are present. FIG. 6 shows the example of the optical function of the right opening focus detecting pixel. In addition, the optical function of FIG. 6 is the example where a relation between a horizontal coordinate x and the pixel output of the focus detecting pixel is approximated with a quadratic function. The optical function may be approximated with a linear function or approximated with a cubic function or a higher degree function. Furthermore, FIG. 6 shows the example where, as to certain optical information (e.g., the focal distance), the optical functions corresponding to three values of optical information 1, optical information 2, and optical information 3 are stored in the ROM 229. The optical function calculating section 2172b selects the optical function corresponding to the optical information acquired by the optical information acquiring section 2172a, from the three optical functions of FIG. 6. The number of the optical functions to be stored in the ROM 229 is suitably determined in a range allowed by a capacity of the ROM 229. In addition, a memory in which the optical functions are stored is not necessarily limited to the ROM on a camera side, and the optical functions may be stored in the ROM 109 in the interchangeable lens 100. Further, the optical function may be acquired by communication with the interchangeable lens 100.

After the calculation of the optical function or in parallel with the calculation of the optical function, the pixel function calculating section 2172c calculates the pixel function (step S106). Hereinafter, an example of a calculating technique of the pixel function will be described with reference to FIGS. 7A and 7B.

Figure 7A:
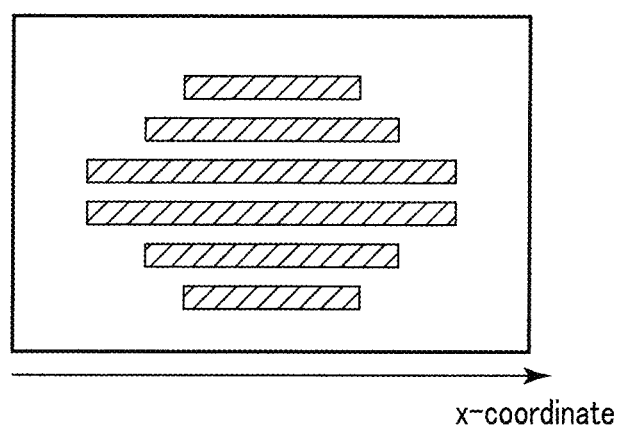
FIG. 7A is a first diagram to explain an example of a calculating technique of a pixel function.

Usually, the focus detecting pixels are disposed in regions where focus detection is required, i.e., hatched regions (hereinafter referred to as island regions) in FIG. 7A. Here, before describing the calculating technique of the pixel function, it is defined that n right opening focus detecting pixels and n left opening focus detecting pixels are disposed at positions of the Gr pixels in the island regions. Additionally, as shown in FIG. 7A, the horizontal direction of the imaging element 207 is defined as an x-axis, and further, a start x-coordinate of the horizontal direction of the focus detecting pixel (the island region) is defined as start x.

When the pixel function is calculated, the pixel function calculating section 2172c calculates a ratio Dif_B between the pixel outputs of two imaging pixels B adjacent to the focus detecting pixel. For example, in the case of a right opening focus detecting pixel Gr2 shown in FIG. 7B, a ratio between a pixel output B2 of an imaging pixel B2 and a pixel output B3 of an imaging pixel B3 which is shown by an arrow 1 is calculated. Therefore, Dif_B is given by the following (Equation 1).

$$Dif\_B = B2/B3 \qquad \text{(Equation 1)}$$

Subsequently, the pixel function calculating section 2172c calculates a ratio Dif_G between the pixel outputs of two imaging pixels Gb having the same color as in the focus detecting pixel and being in the vicinity of the focus detecting pixel. For example, in the case of the right opening focus detecting pixel Gr2, a ratio between a pixel output Gb2 of an imaging pixel Gb2 and a pixel output Gb3 of an imaging pixel Gb3 which is shown by an arrow 2 is calculated. Therefore, Dif_G is given by the following (Equation 2).

$$Dif\_G = Gb2/Gb3 \qquad \text{(Equation 2)}$$

Figure 7B:
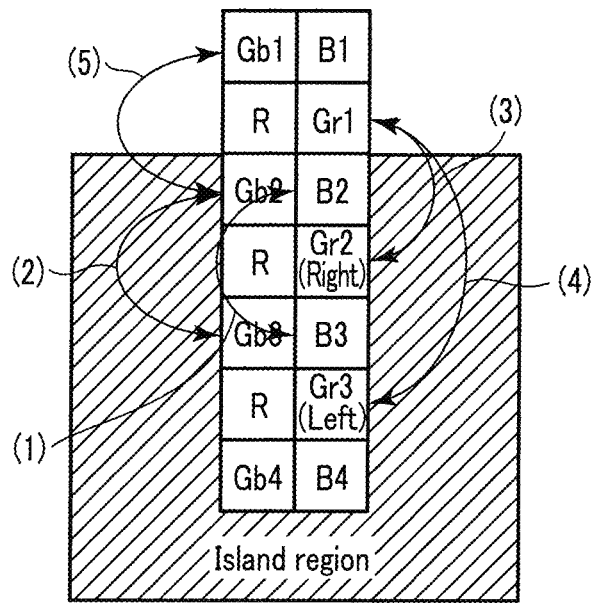
FIG. 7B is a second diagram to explain an example of the calculating technique of the pixel function.

Subsequently, the pixel function calculating section 2172c calculates a ratio between the pixel output of the focus detecting pixel and a pixel output of an imaging pixel Gr having the same color as in the focus detecting pixel and being in the vicinity of a direction orthogonal to a detecting direction of the phase difference. For example, in the case of the right opening focus detecting pixel Gr2, a ratio between a pixel output Gr2 of the right opening focus detecting pixel Gr2 and a pixel output Gr1 of an imaging pixel Gr1 which is shown by an arrow 3 is calculated. Additionally, in the case of a left opening focus detecting pixel Gr3, a ratio between a pixel output Gr3 of the left opening focus detecting pixel Gr3 and the pixel output Gr1 of the imaging pixel Gr1 which is shown by an arrow 4 is calculated. Here, the imaging pixel Gr1 in the example of FIG. 7B is a pixel outside an island. When all the Gr pixels in the island are not the focus detecting pixels, a ratio to the pixel output of the imaging pixel Gr in the island may be calculated. Subsequently, the pixel function calculating section 2172c calculates a ratio of the pixel output of the imaging pixel Gr having the same color as in the focus detecting pixel and being in the vicinity of the direction orthogonal to the detecting direction of the phase difference, to a difference between the pixel outputs of the two imaging pixels Gb in the vicinity of this imaging pixel Gr. For example, in the case of the right opening focus detecting pixel Gr2, a ratio of the pixel output of the imaging pixel Gr1 to a difference between a pixel output of an imaging pixel Gb1 and the pixel output of the imaging pixel Gb2 which is shown by an arrow 5 is calculated. Subsequently, the pixel function calculating section 2172c calculates a ratio Dif_pRi between pixel outputs of the focus detecting pixel and the imaging pixel in the vicinity of the focus detecting pixel in which a pattern change is taken into consideration. Dif_pRi is given by the following (Equation 3).

$$Dif\_pRi = (Gr2/Gr1) - (Gb1 - Gb2)/Gr1 \quad \text{(Equation 3)}$$

A first term of (Equation 3) indicates a ratio between pixel outputs of a phase detecting pixel and an imaging pixel in the vicinity of the phase detecting pixel, and a second term indicates an influence degree of the pattern change.

The pixel function calculating section 2172c calculates a weight coefficient W by use of Dif_B and Dif_G. The weight coefficient W is a coefficient that comes closer to 1 as each of Dif_B and Dif_G comes closer to 1, and is calculated by using a Gaussian function as shown by the following (Equation 4). The weight coefficient W does not necessarily have to be calculated by using the Gaussian function.

$$W = \exp\left(-\frac{(1 - (Dif\_B + Dif\_G)/2)^2}{\sigma}\right) \quad \text{(Equation 4)}$$

Here, σ of (Equation 4) is a standard deviation and is arbitrarily set during, for example, designing. For example, when σ=0.1, 0.1 is the standard deviation in the Gaussian function.

After calculating Dif_pRi concerning each focus detecting pixel and the weight coefficient W, the pixel function calculating section 2172c calculates the pixel function by use of the weight coefficient W and Dif_pRi of each focus detecting pixel. Here, as an example, the pixel function is represented in the form of a linear function y=ax+b. Here, x is a horizontal coordinate, and y is a pixel output of the focus detecting pixel on the basis of the pixel output of the imaging pixel (i.e., the light quantity decrease amount). In addition, a tilt a and a segment b of the linear function representing the pixel function are given by, for example, a least-squares method as shown in the following (Equation 5).

$$a[0] = \frac{(n-1)\sum_{i=start\_x}^{n-1}(i \times W) \times (Dif\_pRi \times W) - \sum_{i=start\_x}^{n-1}(i \times W) \sum_{i=start\_x}^{n-1}(i \times W) \times (Dif\_pRi \times W)}{(n-1)\sum_{i=start\_x}^{n-1}(i \times W)^2 - \left\{\sum_{i=start\_x}^{n-1}(i \times W)\right\}^2} \quad \text{(Equation 5)}$$

$$b[0] = \frac{\sum_{i=start\_x}^{n-1}(i \times W)^2 \sum_{i=start\_x}^{n-1}(Dif\_pRi \times W) - \sum_{i=start\_x}^{n-1}(i \times W) \times (W \times Dif\_pRi) \sum_{i=start\_x}^{n-1}(i \times W)}{(n-1)\sum_{i=start\_x}^{n-1}(i \times W)^2 - \left\{\sum_{i=start\_x}^{n-1}(i \times W)\right\}^2}$$

Here, 0 that is a value in parentheses of a and b of (Equation 5) indicates that the tilt and the segment indicated by these values are concerned with the right opening focus detecting pixel. As to the left opening focus detecting pixel, the values in the parentheses of a and b of (Equation 5) are set to 1, and the respective values indicated in (Equation 5) are replaced with values concerned with the left opening focus detecting pixel. That is, the first term of (Equation 3) is replaced with Gr3/Gr1 that is a ratio corresponding to the left opening focus detecting pixel.

Here, the description returns to that of FIG. 5. After the optical function and the pixel function are calculated, the correction function selecting section 2172d calculates each of the calculated optical function reliability and the pixel function reliability (step S107). Hereinafter, there will be described an example of a calculating technique of the optical function reliability and the pixel function reliability.

Figure 8:
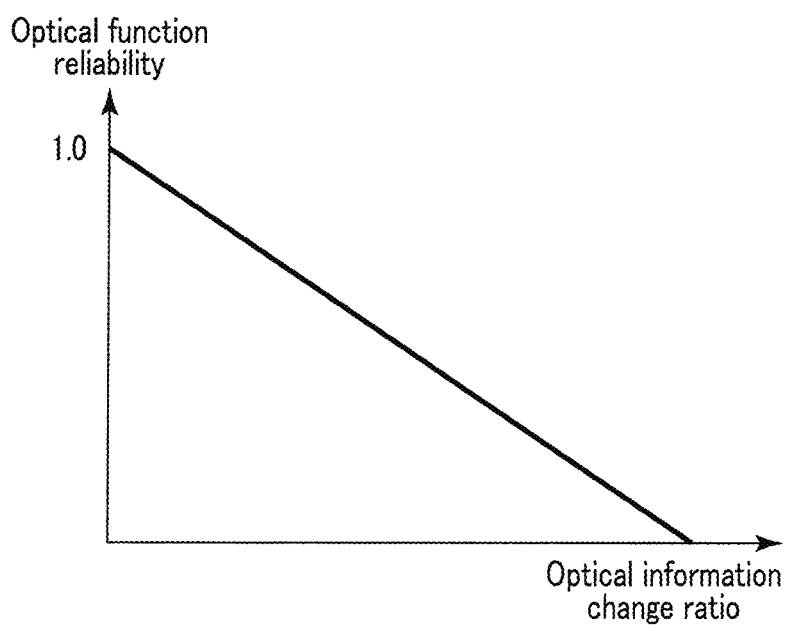
FIG. 8 shows one example of a relation between a change ratio of optical information and an optical function reliability.

The optical function reliability is calculated in accordance with a change ratio of the optical information. The change ratio of the optical information is a change amount of the optical information per unit time (e.g., one frame). FIG. 8 is one example of a relation between the change ratio of the optical information and the optical function reliability. The optical function reliability shown in FIG. 8 changes in a range of 0 to 1, and becomes lower as the change ratio of the optical information becomes larger. For example, when the focal distance noticeably changes in a short time (when high-rate zooming is performed) and when the aperture value noticeably changes, there is, for example, the possibility that the optical information acquired at a time when the imaging was performed is changing optical information and it is doubtful whether the optical information can correctly be acquired. The optical function reliability in such a case lowers. In addition, the optical function reliability may be determined by the following method. For example, when referring to the stored optical information corresponding to a frame (the past frame) before the present frame and when the same optical information continuously changes over the past frames, it is determined that a state of the optical system is changing also in the present frame. For example, when the focal distance continuously changes in the most recent three continuous frames, it is determined that, also in the present frame, zoom is driving and the state of the optical system is changing, thereby lowering the optical function reliability. The above past three frames may be the predetermined number of the frames, e.g., five frames or ten frames. In addition, the past optical information does not necessarily have to correspond to the past frame, and may be what is described below. For example, the optical information may be acquired, stored and used by periodic communication between the interchangeable lens 100 (the CPU 107) and the camera main body 200 (the CPU 215) which is independent of an imaging period (a frame period).

The reliability of the pixel function is, for example, an integrated value of the weight coefficients W calculated as to the respective focus detecting pixels. As described above, the weight coefficient W is a coefficient that comes closer to 1 as each of Dif_B and Dif_G comes closer to 1. Further, each of Dif_B and Dif_G is a change of the pixel output of each of the imaging pixels around the focus detecting pixel. The change of the pixel output which includes a color different from that of each of the focus detecting pixels around the focus detecting pixel is checked, so that the reliability of the influence degree of the pattern change in (Equation 3) can be seen. That is, when the integrated value of the weight coefficients W is small, the pixel function reliability lowers.

After calculating the optical function reliability and the pixel function reliability, the correction function selecting section 2172d determines whether or not the present frame is the second frame or later after the start of the live view (step S108). When it is determined in the step S108 that the present frame is not the second frame or later after the live view start, i.e., the present frame is the first frame, the correction function selecting section 2172d skips processing of step S109. When it is determined in the step S108 that the present frame is the second frame or later after the live view start, the correction function selecting section 2172d acquires various types of information calculated in the past frame (step S109). Here, the various types of information include the optical function, the pixel function, the optical function reliability and the pixel function reliability in the past frame, and are stored in, for example, the DRAM 227. In addition, the past frame is, for example, one previous frame. However, the past frame is not limited to one previous frame. In addition, information of the past frames may be acquired.

Subsequently, the correction function selecting section 2172d performs correction function determination processing (step S110). The correction function determination processing is processing of determining which one of the optical function and the pixel function is to be used during pixel correction of step S111. Hereinafter, the correction function determination processing will be described with reference to FIG. 9.

Figure 9:
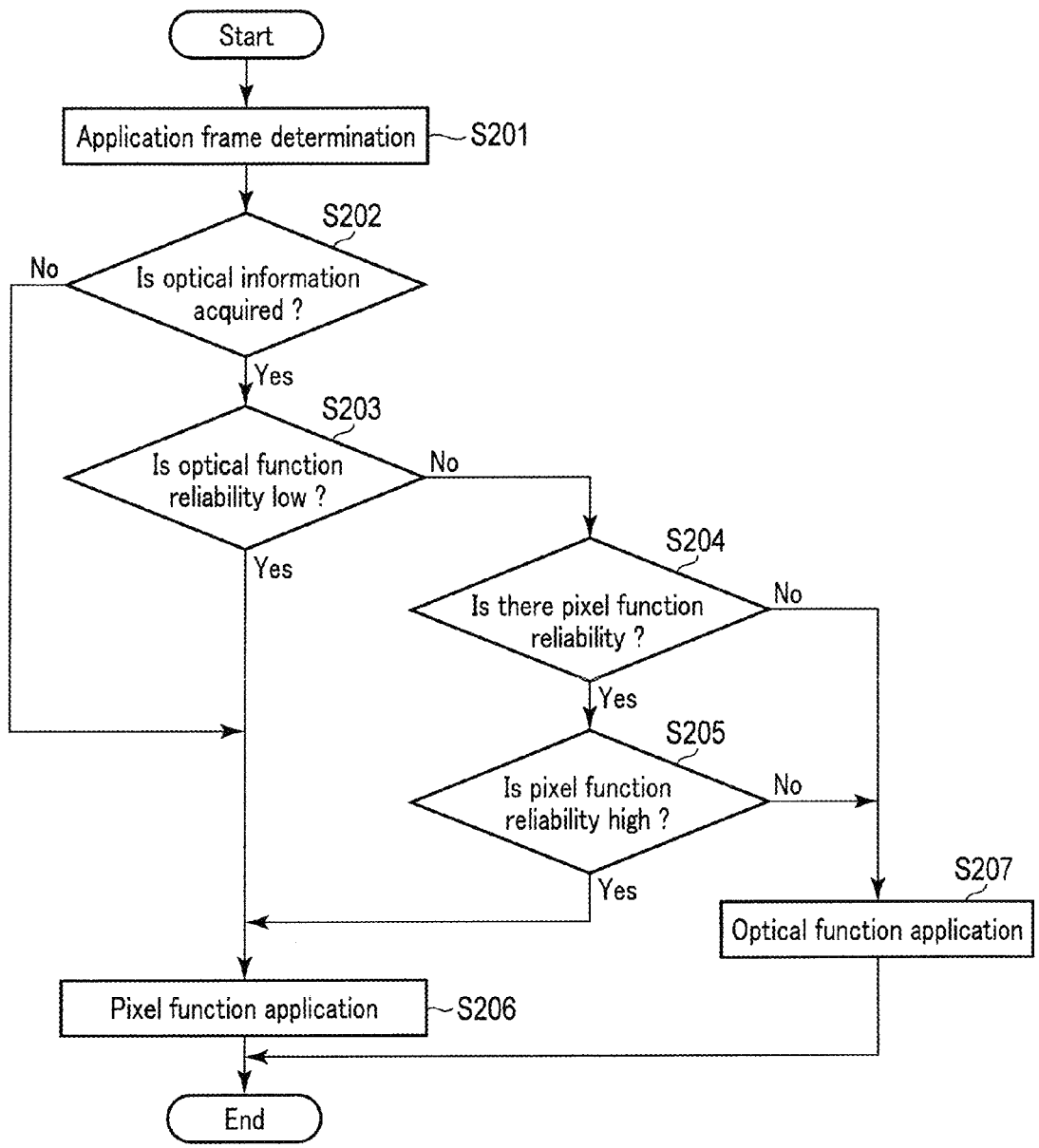
FIG. 9 is a flowchart concerning a correction function determination processing.

In FIG. 9, the correction function selecting section 2172d performs application frame determination processing (step S201). The application frame determination processing is processing of determining information for use in the application frame determination processing of the present frame in the information of the past frame acquired in the step S109. For example, the information of the frame in which the optical function reliability or the pixel function reliability is in excess of a predetermined threshold value is for use in the application frame determination processing of the present frame.

After the application frame determination processing, the correction function selecting section 2172d determines whether or not the optical information can be acquired in the past frame or the present frame (step S202). Here, a case where the optical information cannot be acquired is such a case as described below. Examples of the case include a case where an interchangeable lens that does not have an electric contact (the I/F 111) for communication is attached, and a case where the I/F for communication is different from that on the camera side and an optical system such as a front converter is further attached to a tip of the lens that cannot perform the communication or the interchangeable lens, and the optical system is detected to determine that the present optical information is unsuitable. When it is determined in the step S202 that the optical information can be acquired, the correction function selecting section 2172d determines whether the optical function reliability obtained in the past frame or the present frame is low, i.e., whether or not the reliability is smaller than the threshold value (step S203). The threshold value of the optical function reliability of the step S203 may be the same as or different from the threshold value of the optical function reliability in the step S201. When it is determined in the step S203 that a low reliability is not present among the optical function reliabilities obtained in the past frame or the present frame, the correction function selecting section 2172d determines whether or not the pixel function reliability can be obtained in the past frame or the present frame (step S204). When it is determined in the step S204 that the pixel function reliability can be obtained, the correction function selecting section 2172d determines whether or not a high reliability is present among the pixel function reliabilities obtained in the past frame or the present frame, i.e., whether or not the pixel function reliability in excess of a threshold value is present (step S205). The threshold value to the pixel function reliability of the step S205 may be the same as or different from the threshold value of the pixel function reliability in the step S201. In addition, when the threshold value of the pixel function reliability of the step S205 is made different from the threshold value of the pixel function reliability in the step S201, the threshold value may be made different in accordance with, for example, the optical function reliability.

When it is determined in the step S202 that the optical information cannot be acquired in the past frame or the present frame, when it is determined in the step S203 that the low reliability is present among optical reliabilities obtained in the past frame or the present frame or when it is determined in the step S205 that the high reliability is present among the pixel function reliabilities, the correction function selecting section 2172d selects the pixel function as the correction function (step S206). Afterward, the correction function selecting section 2172d ends the processing of FIG. 9. Here, when the pixel functions having the high reliability are present, the pixel function closest to the present frame or the pixel function having the highest reliability is selected as the correction function.

When it is determined in the step S204 that the pixel function reliability cannot be obtained or when it is determined in the step S205 that the high reliability is not present among the pixel function reliabilities, the correction function selecting section 2172d selects the optical function as the correction function (step S207). Afterward, the correction function selecting section 2172d ends the processing of FIG. 9. Here, when the optical functions having the high reliability are present, the optical function closest to the present frame or the optical function having the highest reliability is selected as the correction function.

As described above, in the correction function determination processing of the present embodiment, when the optical function reliability is low in a case where the optical function cannot be obtained, a case where the optical function can be obtained but the state of the optical system is changing, or the like, the pixel function is selected as the correction function. In addition, even when the optical function having the high reliability can be obtained, the pixel function is selected as the correction function in a case where the pixel function having the high reliability can be obtained. Further, when the optical function having the high reliability can be obtained but the pixel function having the high reliability cannot be obtained, the optical function is selected as the correction function.

Here, in the example of FIG. 9, when both of the optical function and the pixel function have the high reliability, the pixel function is selected as the correction function. On the other hand, when both of the optical function and the pixel function have the high reliability, a function obtained by weighting and averaging the optical function and the pixel function with the reliability may be selected as the correction function. In this case, the optical function and the pixel function need to be a function of the same degree.

Here, the description returns to that of FIG. 5. After the correction function determination processing, the pixel correcting section 2173 corrects the pixel output of the focus detecting pixel (step S111). Each of the optical function and the pixel function is a function that associates the horizontal coordinate of the focus detecting pixel with the pixel output of the focus detecting pixel on the basis of the pixel output of the imaging pixel. That is, it can be considered that each of the optical function and the pixel function is a function indicating the light quantity decrease amount for each horizontal coordinate of the focus detecting pixel. Therefore, gain correction is performed to multiply the pixel output of each focus detecting pixel by the value of the correction function corresponding to the horizontal coordinate of each focus detecting pixel, whereby the light quantity decrease in the pixel output of each focus detecting pixel is corrected.

After the pixel correction, the image processor 217 executes the image processing of the pixel correction processing and later (step S112). After the end of the image processing, the display section 223 displays the image based on the image data obtained as the result of the image processing of the image processor 217. With such displaying, a series of operations of the live view end. After the live view, the CPU 215 stores various types of information calculated in the present frame in, for example, the DRAM 227 (step S113). Afterward, the CPU 215 returns the processing to the step S101. Various types of information of the step S113 include the optical function, the pixel function, the optical function reliability, and the pixel function reliability, and the information is acquired in the step S109 of the next frame. Here, when the information of the desired number of the frames is already stored in the DRAM 227 at a time of the step S113, old information is deleted. In addition, the optical function or pixel function having the low reliability may be prevented from being stored in the DRAM 227.

As described above, in the present embodiment, to correct the pixel output of the focus detecting pixel, the optical function calculated from the optical information and the pixel function calculated from the imaging data are selectively used. In consequence, it is possible to correct the pixel output even in a situation where the optical information cannot be acquired in real time. In addition, it is determined which one of the optical function and the pixel function is to be selected as the correction function, in accordance with the reliability corresponding to each function. In consequence, possibilities of selection mistakes from the optical function and the pixel function can be decreased, and a reliability of the pixel correction can improve.

In addition, the selection of the optical function or the pixel function is performed by using the information of the past frames, and hence, the reliability of the pixel correction can further improve. Here, in the examples of the present embodiment, the pixel function reliability or optical function reliability of the past frame is individually determined. On the other hand, the determining may be performed by using an average pixel function reliability or optical function reliability of the past frames.

In addition, each processing by the abovementioned embodiment may be stored as a program that can be executed by the CPU 215. In addition, the processing can be stored in a storage medium of an external storage device such as a memory card (a ROM card, a RAM card or the like), a magnetic disc (a floppy disc, a hard disc or the like), an optical disc (CD-ROM, DVD or the like), or a semiconductor memory, and distributed. Further, the CPU 215 reads the program stored in this storage medium of the external storage device, and an operation is controlled by this read program, so that the abovementioned processing can be executed.

What is claimed is:

1. An imaging device comprising:
an imaging section that performs imaging by an imaging element in which focus detecting pixels to perform focus detection are disposed at positions of parts of imaging pixels, and outputs image data;
an image processor that corrects pixel outputs to be output from the focus detecting pixels in the image data by a correction function; and
a control section that allows the imaging section to repeatedly execute an imaging operation, and acquires the image data corresponding to frames,
wherein the image processor includes:
an optical information acquiring section that acquires optical information of a photographing optical system to form an image in the imaging element;
an optical function calculating section that calculates an optical function to determine the correction function based on the optical information;
a pixel function calculating section that calculates a pixel function to determine the correction function based on the pixel outputs of the pixels positioned around the focus detecting pixels; and
a correction function selecting section that selects the correction function to correct the pixel output to be output from the focus detecting pixel corresponding to each of the frames, based on the optical function, the pixel function and the optical information.

2. The imaging device according to claim 1,
wherein the correction function selecting section selects the pixel function as the correction function, when the photographing optical system is optically changing.

3. The imaging device according to claim 1,
wherein a focal distance of the photographing optical system is variable, and the optical information includes the focal distance of the photographing optical system.

4. The imaging device according to claim 1,
wherein the photographing optical system includes a focus lens, and the optical information includes a position of the focus lens.

5. The imaging device according to claim 1,
wherein the photographing optical system has a diaphragm, and the optical information includes an opening amount of the diaphragm.

6. The imaging device according to claim 1,
wherein the correction function selecting section calculates at least one of a pixel function reliability indicating a reliability of the pixel function and an optical function reliability indicating a reliability of the optical function, and selects the correction function in the frame based on at least one of the calculated pixel function reliability and the calculated optical function reliability.

7. The imaging device according to claim 6,
wherein the correction function selecting section calculates at least one of the pixel function reliability and the optical function reliability temporally corresponding to the frames, selects a reliability higher than a first threshold value from the calculated pixel function reliability and the calculated optical function reliability, and selects the correction function in the frame based on the pixel function corresponding to the pixel function reliability of the newest frame or the optical function corresponding to the optical function reliability of the newest frame of the selected pixel function reliability and the selected optical function reliability.

8. The imaging device according to claim 6,
wherein the correction function selecting section calculates at least one of the pixel function reliability and the optical function reliability temporally corresponding to the frames, and selects the correction function in the frame based on the pixel function or the optical function corresponding to the function having the highest reliability of the calculated pixel function reliability and the calculated optical function reliability.

9. The imaging device according to claim 6,
wherein the correction function selecting section selects the optical function as the correction function, when all the pixel function reliabilities temporally corresponding to the frames are lower than a second threshold value.

10. A camera system, comprising: a camera main body having an imaging element in which focus detecting pixels to perform focus detection are disposed at positions of parts of imaging pixels; and an interchangeable lens detachably attached to the camera main body and having a photographing optical system, wherein the interchangeable lens comprises:
an optical information generating section that generates an optical information concerning the photographing optical system; and
a lens control section that performs communication with the camera main body, and transmits the optical information,
the camera main body comprises:
an imaging section that images by the imaging element and outputs image data;
an image processor that corrects pixel outputs to be output from the focus detecting pixels in the image data by a correction function; and
a control section that performs communication with the lens control section to acquire the optical information, allows the imaging section to repeatedly execute an imaging operation, and acquire the image data corresponding to frames, and
the image processor includes:
an optical function calculating section that calculates an optical function to determine the correction function based on the optical information;
a pixel function calculating section that calculates a pixel function to determine the correction function based on the pixel outputs of the pixels positioned around the focus detecting pixels; and
a correction function selecting section that selects the correction function to correct the pixel output to be output from the focus detecting pixel corresponding to each of the frames, based on the optical function, the pixel function and the optical information.

11. The camera system according to claim 10,
wherein the correction function selecting section selects the pixel function as the correction function, when the photographing optical system is optically changing.

12. The camera system according to claim 10,
wherein a focal distance of the photographing optical system is variable, and the optical information includes the focal distance of the photographing optical system.

13. The camera system according to claim 10,
wherein the photographing optical system has a focus lens, and the optical information includes a position of the focus lens.

14. The camera system according to claim 10,
wherein the photographing optical system includes a diaphragm, and the optical information includes an opening amount of the diaphragm.

15. The camera system according to claim 10,
wherein the optical function generating section generates distortion aberration information of the photographing optical system.

16. The camera system according to claim 10,
wherein the correction function selecting section calculates at least one of a pixel function reliability indicating a reliability of the pixel function and an optical function reliability indicating a reliability of the optical function, and selects the correction function in the frame based on at least one of the calculated pixel function reliability and the calculated optical function reliability.

17. The camera system according to claim 16,
wherein the correction function selecting section calculates at least one of the pixel function reliability and the optical function reliability temporally corresponding to the frames, selects a reliability higher than a first threshold value from the calculated pixel function reliability and the calculated optical function reliability, and selects the correction function in the frame based on the pixel function corresponding to the pixel function reliability of the newest frame or the optical function corresponding to the optical function reliability of the newest frame of the selected pixel function reliability and the selected optical function reliability.

18. The camera system according to claim 16,
wherein the correction function selecting section calculates at least one of the pixel function reliability and the optical function reliability temporally corresponding to the frames, and selects the correction function in the frame based on the pixel function or the optical function corresponding to the function having the highest reliability of the calculated pixel function reliability and the calculated optical function reliability.

19. The camera system according to claim 16,
wherein the correction function selecting section selects the optical function as the correction function, when all the pixel function reliabilities temporally corresponding to the frames are lower than a second threshold value.

20. An image processing method which corrects pixel outputs to be output from focus detecting pixels in image data imaged by an imaging element in which the focus detecting pixels to perform focus detection are disposed at positions of parts of imaging pixels, the method comprising:

allowing the imaging element to repeatedly execute an imaging operation to acquire the image data corresponding to frames;

acquiring optical information of a photographing optical system to form an image in the imaging element;

calculating an optical function to determine a correction function based on the optical information;

calculating a pixel function to determine the correction function based on the pixel outputs of the pixels positioned around the focus detecting pixels; and selecting the correction function to correct the pixel output to be output from the focus detecting pixel corresponding to each of the frames, based on the optical function, the pixel function and the optical information.

21. The image processing method according to claim 20, which further comprises:

selecting the pixel function as the correction function, when the photographing optical system is optically changing.

22. The image processing method according to claim 20, which includes:

calculating at least one of a pixel function reliability indicating a reliability of the pixel function and an optical function reliability indicating a reliability of the optical function; and selecting the correction function in the frame based on at least one of the calculated pixel function reliability and the calculated optical function reliability.

23. The image processing method according to claim 22, which includes:

calculating at least one of the pixel function reliability and the optical function reliability temporally corresponding to the frames;

selecting a reliability higher than a first threshold value from the calculated pixel function reliability and the calculated optical function reliability; and selecting the correction function in the frame based on the pixel function corresponding to the pixel function reliability of the newest frame or the optical function corresponding to the optical function reliability of the newest frame in the selected pixel function reliability and the selected optical function reliability.

24. The image processing method according to claim 22, which includes:

calculating at least one of the pixel function reliability and the optical function reliability temporally corresponding to the frames; and selecting the correction function in the frame based on the pixel function or the optical function corresponding to the function having the highest reliability in the calculated pixel function reliability and the calculated optical function reliability.

25. The image processing method according to claim 22, which includes:

selecting the optical function as the correction function, when all the pixel function reliabilities temporally corresponding to the frames are lower than a second threshold value.

* * * * *

UNITED STATES PATENT AND TRADEMARK OFFICE
CERTIFICATE OF CORRECTION

PATENT NO. : 9,477,140 B2  
APPLICATION NO. : 14/869449  
DATED : October 25, 2016  
INVENTOR(S) : Atsuro Okazawa and Takuya Matsunaga It is certified that error appears in the above-identified patent and that said Letters Patent is hereby corrected as shown below:

On the Title Page

The Foreign Application Priority Data is missing. The patent should include the following inserted text:

-- (30)     Foreign Application Priority Data  
Jul. 10, 2013   (JP) .............................. 2013-144621 --

Signed and Sealed this  
Twentieth Day of February, 2018

Andrei Iancu  
*Director of the United States Patent and Trademark Office*